United States Patent
Lazier

(10) Patent No.: US 12,086,450 B1
(45) Date of Patent: Sep. 10, 2024

(54) SYNCHRONOUS GET COPY FOR ASYNCHRONOUS STORAGE

(71) Applicant: Amazon Technologies, Inc., Seattle, WA (US)

(72) Inventor: Colin Laird Lazier, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/143,366

(22) Filed: Sep. 26, 2018

(51) Int. Cl.
*G06F 3/06* (2006.01)
*G06F 16/2455* (2019.01)
*G06F 16/27* (2019.01)

(52) U.S. Cl.
CPC ............ *G06F 3/065* (2013.01); *G06F 3/0611* (2013.01); *G06F 3/0659* (2013.01); *G06F 3/067* (2013.01); *G06F 16/2455* (2019.01); *G06F 16/273* (2019.01)

(58) Field of Classification Search
CPC ...... G06F 3/0646; G06F 3/065; G06F 3/0611; G06F 3/0659; G06F 3/067; G06F 16/273; G06F 16/275; G06F 16/2455
See application file for complete search history.

(56) References Cited

U.S. PATENT DOCUMENTS

| | | | |
|---|---|---|---|
| 4,309,569 A | 1/1982 | Merkle | |
| 5,239,640 A | 8/1993 | Froemke et al. | |
| 5,506,809 A | 4/1996 | Csoppenszky et al. | |
| 5,586,291 A | 12/1996 | Lasker et al. | |
| 5,701,407 A | 12/1997 | Matsumoto et al. | |
| 5,737,745 A | 4/1998 | Matsumoto et al. | |
| 5,751,997 A | 5/1998 | Kullick et al. | |
| 5,900,007 A | 5/1999 | Nunnelley et al. | |
| 6,023,710 A | 2/2000 | Steiner et al. | |
| 6,068,661 A * | 5/2000 | Shari | H04L 12/40 703/24 |
| 6,138,126 A | 10/2000 | Hitz et al. | |

(Continued)

FOREIGN PATENT DOCUMENTS

| | | |
|---|---|---|
| CN | 1487451 A | 4/2004 |
| CN | 1534949 A | 10/2004 |

(Continued)

OTHER PUBLICATIONS

Advanced Computer & Network Corporation, "RAID Level 5: Independent Data Disks With Distributed Parity Blocks", May 12, 2011, from https://web.archive.org/web/20110512213916/http://www.acnc.com/raidedu/5, 2 pages.

(Continued)

*Primary Examiner* — Jason W Blust
(74) *Attorney, Agent, or Firm* — Davis Wright; Tremaine LLP—ATI

(57) ABSTRACT

A system receives a request to retrieve a data object from a data storage device associated with an asynchronous-access data storage service. For data object retrieval, the system identifies the data storage device and creates a job corresponding to the data object retrieval. Once the job is executed, the data object is retrieved to satisfy the request without having to restore the data object and further provided to a data storage device associated with a synchronous-access data storage service to satisfy subsequent requests synchronously.

22 Claims, 9 Drawing Sheets

(56) References Cited

U.S. PATENT DOCUMENTS

| | | |
|---|---|---|
| 6,208,999 B1 | 3/2001 | Spilo et al. |
| 6,219,711 B1 * | 4/2001 | Chari ................. G06F 13/4081 |
| | | 709/218 |
| 6,374,264 B1 | 4/2002 | Bohannon et al. |
| 6,543,029 B1 | 4/2003 | Sandorfi |
| 6,578,127 B1 | 6/2003 | Sinclair |
| 6,604,224 B1 | 8/2003 | Armstrong et al. |
| 6,606,629 B1 | 8/2003 | DeKoning et al. |
| 6,747,825 B1 | 6/2004 | Ng et al. |
| 6,768,863 B2 | 7/2004 | Ando et al. |
| 6,775,831 B1 | 8/2004 | Carrasco et al. |
| 6,886,013 B1 * | 4/2005 | Beranek ................. H04N 21/40 |
| | | 715/234 |
| 6,950,967 B1 | 9/2005 | Brunnett et al. |
| 6,959,326 B1 | 10/2005 | Day et al. |
| 7,076,604 B1 | 7/2006 | Thelin |
| 7,120,737 B1 | 10/2006 | Thelin |
| 7,155,713 B1 | 12/2006 | Burkhardt et al. |
| 7,269,733 B1 | 9/2007 | O'Toole, Jr. |
| 7,310,801 B2 | 12/2007 | Burkhardt et al. |
| 7,340,490 B2 | 3/2008 | Teloh et al. |
| 7,409,495 B1 | 8/2008 | Kekre et al. |
| 7,487,316 B1 | 2/2009 | Hall et al. |
| 7,487,385 B2 | 2/2009 | Rodrigues et al. |
| 7,577,689 B1 | 8/2009 | Masinter et al. |
| 7,587,398 B1 * | 9/2009 | Fredricksen .......... G06F 16/957 |
| 7,644,061 B1 | 1/2010 | Fallis et al. |
| 7,685,309 B2 | 3/2010 | Caronni et al. |
| 7,730,071 B2 | 6/2010 | Iwasaki et al. |
| 7,774,466 B2 | 8/2010 | Coates et al. |
| 7,783,600 B1 | 8/2010 | Spertus et al. |
| 7,814,078 B1 | 10/2010 | Forman et al. |
| 7,827,201 B1 | 11/2010 | Gordon et al. |
| 7,840,878 B1 | 11/2010 | Tang et al. |
| 7,860,825 B2 | 12/2010 | Chatterjee et al. |
| 7,929,551 B2 | 4/2011 | Dietrich et al. |
| 7,937,369 B1 | 5/2011 | Dings et al. |
| 8,006,125 B1 | 8/2011 | Meng et al. |
| 8,015,158 B1 | 9/2011 | Mankovsky et al. |
| 8,019,925 B1 | 9/2011 | Vogan et al. |
| 8,041,677 B2 | 10/2011 | Sumner et al. |
| 8,051,052 B2 | 11/2011 | Jogand-Coulomb et al. |
| 8,060,473 B1 | 11/2011 | Dhumale et al. |
| 8,108,686 B2 | 1/2012 | Dik et al. |
| 8,130,554 B1 | 3/2012 | Linnell |
| 8,140,843 B2 | 3/2012 | Holtzman et al. |
| 8,156,381 B2 | 4/2012 | Tamura et al. |
| 8,161,292 B2 | 4/2012 | Carbone |
| 8,204,969 B2 | 6/2012 | Carcerano et al. |
| 8,245,031 B2 | 8/2012 | Holtzman et al. |
| 8,266,691 B2 | 9/2012 | Zvi |
| 8,266,711 B2 | 9/2012 | Holtzman et al. |
| 8,291,170 B1 | 10/2012 | Zhang et al. |
| 8,296,410 B1 | 10/2012 | Myhill et al. |
| 8,336,043 B2 | 12/2012 | Lavery et al. |
| 8,352,430 B1 | 1/2013 | Myhill et al. |
| 8,352,439 B1 | 1/2013 | Lee et al. |
| 8,370,315 B1 | 2/2013 | Efstathopoulos et al. |
| 8,464,133 B2 | 6/2013 | Grube et al. |
| 8,473,816 B2 | 6/2013 | Zvibel |
| 8,554,918 B1 | 10/2013 | Douglis |
| 8,595,596 B2 | 11/2013 | Grube et al. |
| 8,620,870 B2 | 12/2013 | Dwarampudi et al. |
| 8,671,076 B2 | 3/2014 | Price et al. |
| 8,699,159 B1 | 4/2014 | Malina |
| 8,806,502 B2 | 8/2014 | Gargash et al. |
| 8,838,911 B1 | 9/2014 | Hubin et al. |
| 8,898,114 B1 | 11/2014 | Feathergill et al. |
| 8,959,067 B1 | 2/2015 | Patiejunas et al. |
| 8,972,677 B1 | 3/2015 | Jones |
| 8,990,215 B1 | 3/2015 | Reztlaff, II et al. |
| 9,047,306 B1 | 6/2015 | Frolund et al. |
| 9,053,212 B2 | 6/2015 | Beckey et al. |
| 9,372,854 B2 | 6/2016 | Gold et al. |
| 9,767,098 B2 | 9/2017 | Patiejunas et al. |
| 2002/0055942 A1 | 5/2002 | Reynolds |
| 2002/0091903 A1 | 7/2002 | Mizuno |
| 2002/0103815 A1 | 8/2002 | Duvillier et al. |
| 2002/0122203 A1 | 9/2002 | Matsuda |
| 2002/0161972 A1 | 10/2002 | Talagala et al. |
| 2002/0186844 A1 | 12/2002 | Levy et al. |
| 2003/0033308 A1 | 2/2003 | Patel et al. |
| 2003/0145213 A1 | 7/2003 | Carbone |
| 2003/0149717 A1 | 8/2003 | Heinzman |
| 2004/0003272 A1 | 1/2004 | Bantz et al. |
| 2004/0068479 A1 * | 4/2004 | Wolfson ................. G06F 16/273 |
| 2004/0098565 A1 | 5/2004 | Rohlman et al. |
| 2004/0243737 A1 | 12/2004 | Beardsley et al. |
| 2005/0050342 A1 | 3/2005 | Boivie et al. |
| 2005/0114338 A1 | 5/2005 | Borthakur et al. |
| 2005/0125508 A1 * | 6/2005 | Smith ................. H04L 67/1002 |
| | | 709/220 |
| 2005/0160427 A1 | 7/2005 | Ustaris |
| 2005/0187897 A1 | 8/2005 | Pawar et al. |
| 2005/0203976 A1 | 9/2005 | Hyun et al. |
| 2005/0262378 A1 | 11/2005 | Sleeman et al. |
| 2005/0267935 A1 | 12/2005 | Gandhi et al. |
| 2006/0005074 A1 | 1/2006 | Yanai et al. |
| 2006/0015529 A1 | 1/2006 | Yagawa |
| 2006/0020594 A1 | 1/2006 | Garg et al. |
| 2006/0053088 A1 | 3/2006 | Ali et al. |
| 2006/0095741 A1 | 5/2006 | Asher et al. |
| 2006/0107266 A1 | 5/2006 | Martin et al. |
| 2006/0190510 A1 | 8/2006 | Gabryjelski et al. |
| 2006/0242064 A1 | 10/2006 | Jogand-Coulomb et al. |
| 2006/0242065 A1 | 10/2006 | Jogand-Coulomb et al. |
| 2006/0242066 A1 | 10/2006 | Jogand-Coulomb et al. |
| 2006/0242067 A1 | 10/2006 | Jogand-Coulomb et al. |
| 2006/0242068 A1 | 10/2006 | Jogand-Coulomb et al. |
| 2006/0242150 A1 | 10/2006 | Jogand-Coulomb et al. |
| 2006/0242151 A1 | 10/2006 | Jogand-Coulomb et al. |
| 2006/0272023 A1 | 11/2006 | Schmeidler et al. |
| 2007/0011472 A1 | 1/2007 | Cheng |
| 2007/0043667 A1 | 2/2007 | Qawami et al. |
| 2007/0050479 A1 | 3/2007 | Yoneda |
| 2007/0056042 A1 | 3/2007 | Qawami et al. |
| 2007/0079087 A1 | 4/2007 | Wang et al. |
| 2007/0101095 A1 | 5/2007 | Gorobets |
| 2007/0156842 A1 | 7/2007 | Vermeulen et al. |
| 2007/0168292 A1 | 7/2007 | Jogand-Coulomb et al. |
| 2007/0174362 A1 | 7/2007 | Pham et al. |
| 2007/0198789 A1 | 8/2007 | Clark et al. |
| 2007/0250674 A1 | 10/2007 | Fineberg et al. |
| 2007/0266037 A1 | 11/2007 | Terry et al. |
| 2007/0282969 A1 | 12/2007 | Dietrich et al. |
| 2007/0283046 A1 | 12/2007 | Dietrich et al. |
| 2008/0010449 A1 | 1/2008 | Holtzman et al. |
| 2008/0010450 A1 | 1/2008 | Holtzman et al. |
| 2008/0010451 A1 | 1/2008 | Holtzman et al. |
| 2008/0010452 A1 | 1/2008 | Holtzman et al. |
| 2008/0010455 A1 | 1/2008 | Holtzman et al. |
| 2008/0010458 A1 | 1/2008 | Holtzman et al. |
| 2008/0010685 A1 | 1/2008 | Holtzman et al. |
| 2008/0022395 A1 | 1/2008 | Holtzman et al. |
| 2008/0022413 A1 | 1/2008 | Holtzman et al. |
| 2008/0034440 A1 | 2/2008 | Holtzman et al. |
| 2008/0059483 A1 | 3/2008 | Williams et al. |
| 2008/0068899 A1 | 3/2008 | Ogihara et al. |
| 2008/0109478 A1 | 5/2008 | Wada et al. |
| 2008/0120164 A1 | 5/2008 | Hassler |
| 2008/0168108 A1 | 7/2008 | Molaro et al. |
| 2008/0177697 A1 | 7/2008 | Barsness et al. |
| 2008/0201707 A1 | 8/2008 | Lavery et al. |
| 2008/0212225 A1 | 9/2008 | Ito et al. |
| 2008/0235485 A1 | 9/2008 | Haertel et al. |
| 2008/0256631 A1 | 10/2008 | Zvi |
| 2008/0285366 A1 | 11/2008 | Fujiwara |
| 2008/0294764 A1 | 11/2008 | Wakako |
| 2009/0013123 A1 | 1/2009 | Hsieh |
| 2009/0070537 A1 | 3/2009 | Cho |
| 2009/0083476 A1 | 3/2009 | Pua et al. |
| 2009/0113167 A1 | 4/2009 | Camble et al. |
| 2009/0132676 A1 | 5/2009 | Tu et al. |
| 2009/0150641 A1 | 6/2009 | Flynn et al. |

(56) References Cited

U.S. PATENT DOCUMENTS

| | | | |
|---|---|---|---|
| 2009/0157700 A1 | 6/2009 | Van Vugt | |
| 2009/0164506 A1 | 6/2009 | Barley et al. | |
| 2009/0187768 A1 | 7/2009 | Carbone | |
| 2009/0193223 A1 | 7/2009 | Saliba et al. | |
| 2009/0198736 A1 | 8/2009 | Shen et al. | |
| 2009/0198889 A1 | 8/2009 | Ito et al. | |
| 2009/0213487 A1 | 8/2009 | Luan et al. | |
| 2009/0234883 A1 | 9/2009 | Hurst et al. | |
| 2009/0240750 A1 | 9/2009 | Seo | |
| 2009/0254572 A1 | 10/2009 | Redlich et al. | |
| 2009/0265568 A1 | 10/2009 | Jackson | |
| 2009/0300403 A1 | 12/2009 | Little | |
| 2009/0313311 A1* | 12/2009 | Hoffmann | G06F 11/2094 |
| 2010/0017446 A1 | 1/2010 | Choi et al. | |
| 2010/0037056 A1 | 2/2010 | Follis et al. | |
| 2010/0037216 A1 | 2/2010 | Carcerano et al. | |
| 2010/0070775 A1 | 3/2010 | Dik et al. | |
| 2010/0077214 A1 | 3/2010 | Jogand-Coulomb et al. | |
| 2010/0088496 A1 | 4/2010 | Zolnowsky et al. | |
| 2010/0094819 A1 | 4/2010 | Bornhoevd et al. | |
| 2010/0131411 A1 | 5/2010 | Jogand-Coulomb et al. | |
| 2010/0131774 A1 | 5/2010 | Jogand-Coulomb et al. | |
| 2010/0131775 A1 | 5/2010 | Jogand-Coulomb et al. | |
| 2010/0138652 A1 | 6/2010 | Sela et al. | |
| 2010/0138673 A1 | 6/2010 | Jogand-Coulomb et al. | |
| 2010/0169222 A1 | 7/2010 | Qawami et al. | |
| 2010/0169544 A1 | 7/2010 | Eom et al. | |
| 2010/0217927 A1 | 8/2010 | Song et al. | |
| 2010/0223259 A1 | 9/2010 | Mizrahi | |
| 2010/0228711 A1 | 9/2010 | Li et al. | |
| 2010/0235409 A1 | 9/2010 | Roy et al. | |
| 2010/0242096 A1 | 9/2010 | Varadharajan et al. | |
| 2010/0275055 A1* | 10/2010 | Edel | G06F 11/2071 |
| | | | 714/6.12 |
| 2011/0026942 A1 | 2/2011 | Naito | |
| 2011/0035757 A1 | 2/2011 | Comer | |
| 2011/0058277 A1 | 3/2011 | de la Fuente et al. | |
| 2011/0060775 A1 | 3/2011 | Fitzgerald | |
| 2011/0071988 A1 | 3/2011 | Resch et al. | |
| 2011/0078407 A1 | 3/2011 | Lewis | |
| 2011/0099324 A1 | 4/2011 | Yeh | |
| 2011/0161679 A1 | 6/2011 | Grube et al. | |
| 2011/0225417 A1 | 9/2011 | Maharajh et al. | |
| 2011/0231597 A1 | 9/2011 | Lai et al. | |
| 2011/0246716 A1 | 10/2011 | Frame et al. | |
| 2011/0247074 A1 | 10/2011 | Manring et al. | |
| 2011/0258630 A1 | 10/2011 | Fee et al. | |
| 2011/0264717 A1 | 10/2011 | Grube et al. | |
| 2011/0265143 A1 | 10/2011 | Grube et al. | |
| 2011/0276656 A1 | 11/2011 | Knapp et al. | |
| 2011/0282839 A1 | 11/2011 | Paksoy et al. | |
| 2011/0289383 A1 | 11/2011 | Dhuse et al. | |
| 2011/0307657 A1 | 12/2011 | Timashev et al. | |
| 2012/0030411 A1 | 2/2012 | Wang et al. | |
| 2012/0079562 A1 | 3/2012 | Anttila et al. | |
| 2012/0137062 A1 | 5/2012 | Arges et al. | |
| 2012/0143830 A1 | 6/2012 | Cormode et al. | |
| 2012/0150528 A1 | 6/2012 | Upadhyaya et al. | |
| 2012/0166576 A1 | 6/2012 | Orsini et al. | |
| 2012/0173392 A1 | 7/2012 | Kirby et al. | |
| 2012/0173822 A1* | 7/2012 | Testardi | G06F 11/1453 |
| | | | 711/135 |
| 2012/0210092 A1 | 8/2012 | Feldman | |
| 2012/0233228 A1 | 9/2012 | Barton et al. | |
| 2012/0233432 A1 | 9/2012 | Feldman et al. | |
| 2012/0284719 A1 | 11/2012 | Phan et al. | |
| 2012/0306912 A1 | 12/2012 | Blanco et al. | |
| 2012/0311260 A1 | 12/2012 | Yamagiwa et al. | |
| 2013/0024581 A1 | 1/2013 | Myhill et al. | |
| 2013/0046974 A1 | 2/2013 | Kamara et al. | |
| 2013/0145371 A1 | 6/2013 | Brunswig et al. | |
| 2013/0254166 A1 | 9/2013 | Kottomtharayil | |
| 2013/0290263 A1 | 10/2013 | Beaverson et al. | |
| 2014/0040974 A1* | 2/2014 | Shkvarchuk | H04L 63/10 |
| | | | 726/1 |
| 2014/0052706 A1 | 2/2014 | Misra et al. | |
| 2014/0068208 A1 | 3/2014 | Feldman | |
| 2014/0149794 A1 | 5/2014 | Shetty et al. | |
| 2014/0161123 A1 | 6/2014 | Starks et al. | |
| 2015/0058503 A1* | 2/2015 | Deguchi | G06F 3/0613 |
| | | | 710/45 |
| 2015/0082458 A1 | 3/2015 | Cooper et al. | |
| 2015/0134625 A1* | 4/2015 | Joshi | G06F 12/0866 |
| | | | 711/100 |
| 2018/0063280 A1* | 3/2018 | Gay | H04L 67/2833 |
| 2019/0303017 A1* | 10/2019 | LeCrone | G06F 3/0659 |

FOREIGN PATENT DOCUMENTS

| | | | |
|---|---|---|---|
| CN | 1619479 | A | 5/2005 |
| CN | 1799051 | A | 7/2006 |
| CN | 101043372 | A | 9/2007 |
| CN | 101110083 | A | 1/2008 |
| CN | 101477543 | A | 7/2009 |
| CN | 101496005 | A | 7/2009 |
| CN | 102292699 | A | 12/2011 |
| EP | 0606131 | B1 | 1/2003 |
| EP | 2883170 | A2 | 6/2015 |
| JP | H05113963 | A | 5/1993 |
| JP | 106149739 | A | 5/1994 |
| JP | H10261075 | A | 9/1998 |
| JP | H1124997 | A | 1/1999 |
| JP | H11259321 | A | 9/1999 |
| JP | 2000023075 | A | 1/2000 |
| JP | 2002278844 | A | 9/2002 |
| JP | 2005122311 | A | 5/2005 |
| JP | 2006285969 | A | 10/2006 |
| JP | 2006526837 | A | 11/2006 |
| JP | 2007515002 | A | 6/2007 |
| JP | 2007257566 | A | 10/2007 |
| JP | 2007299308 | A | 11/2007 |
| JP | 2008299396 | A | 12/2008 |
| JP | 2010251877 | A | 11/2010 |
| JP | 2011043968 | A | 3/2011 |
| JP | 2011518381 | A | 6/2011 |
| JP | 2011170667 | A | 9/2011 |
| JP | 2011197977 | A | 10/2011 |
| KR | 20020088574 | A | 11/2002 |
| KR | 20070058281 | A | 6/2007 |
| WO | 0227489 | A2 | 4/2002 |
| WO | 2007016787 | A2 | 2/2007 |
| WO | 2008083914 | A1 | 7/2008 |
| WO | 2010151813 | A1 | 12/2010 |
| WO | 2012088587 | A1 | 7/2012 |
| WO | 2014025820 | A2 | 2/2014 |

OTHER PUBLICATIONS

Advanced Computer & Network Corporation, "RAID level 6: Independent Data Disks With Two Independent Parity Schemes", May 7, 2011, from https://web.archive.org/web/20110507215950/http://www.acnc.com/raidedu/6, 2 pages.

Amazon Web Services, "Amazon Elastic MapReduce Developer Guide," API Version Nov. 30, 2009, dated Jun. 12, 2012, retrieved on Jun. 22, 2015, from https://web.archive.org/web/20120612043953/https://s3.amazonaws.com/awsdocs/ElasticMapReduce/latest/emr-dg.pdf, 318 pages.

Amazon Web Services, "Amazon Glacier Developer Guide," API Version Jun. 1, 2012, dated Aug. 20, 2012, retrieved Jun. 22, 2015, from https://web.archive.org/web/20120908043705/http://awsdocs.s3.amazonaws.com/glacier/latest/glacier-dg.pdf, 209 pages.

Amazon Web Services, "AWS Import/Export Developer Guide," API Version Jun. 3, 2010, dated Jun. 12, 2012, retrieved Jun. 22, 2015, from https://web.archive.org/web/20120612051330/http://s3.amazonaws.com/awsdocs/ImportExpert/latest/AWSImportExport-dg.pdf, 104 pages.

Amer et al., "Design Issues for a Shingled Write Disk System," 26th IEEE Symposium on Massive Storage Systems and Technologies: Research Track (MSST 2010):1-12, May 2010.

Canadian Notice of Allowance mailed Apr. 24, 2019, Patent Application No. 2881475, filed Aug. 6, 2013, 1 page.

(56) References Cited

OTHER PUBLICATIONS

Canadian Notice of Allowance mailed Mar. 8, 2019, Patent Application No. 2881490, filed Aug. 6, 2013, 1 page.
Canadian Office Action mailed Apr. 17, 2018, Patent Application No. 2881490, filed Aug. 6, 2013, 4 pages.
Canadian Office Action mailed Apr. 25, 2018, Patent Application No. 2881475, filed Aug. 6, 2013, 5 pages.
Canadian Office Action mailed Jan. 21, 2019, Patent Application No. 2881567, filed Aug. 6, 2013, 4 pages.
Canadian Office Action mailed Nov. 20, 2017, Patent Application No. 2881567, filed Aug. 6, 2013, 7 pages.
Chen et al., "RAID: High-Performance, Reliable Secondary Storage," ACM Computing Surveys 1994, 26:145-185, retrieved on Jan. 11, 2016, from https://web.archive.org/web/20040721062927/http://meseec.ce.rit.edu/eecc722-fall2002/papers/io/3/chen94raid.pdf, 69 pages.
Chinese Decision on Rejection mailed Sep. 5, 2018, Patent Application No. 201380042170.X, filed Aug. 6, 2013, 7 pages.
Chinese Notice on Grant of Patent Right for Invention mailed Sep. 26, 2018, Patent Application No. 201380042166.3, filed Aug. 6, 2013, 2 pages.
Chinese Notice on Grant of Patent Right for Invention, mailed Nov. 17, 2017, Patent Application No. 201380042169.7, filed Aug. 6, 2013, 2 pages.
Chinese Notice on the Third Office Action mailed Mar. 19, 2018, Patent Application No. 201380042166.3, filed Aug. 6, 2013, 5 pages.
Chinese Second Office Action mailed Jan. 12, 2018, Patent Application No. 201380042170.X, filed Aug. 6, 2013, 8 pages.
Cisco, "Cisco Standalone HDD Firmware Update Version 3.0—IBM Servers," Nov. 16, 2010, 5 pages.
Duan, "Research and Application of Distributed Parallel Search Hadoop Algorithm," 2012 International Conference on Systems and Informatics (ICSAI 2012), IEEE, May 19, 2012, pp. 2462-2465.
European Communication Pursuant to Article 94(3) EPC mailed Feb. 19, 2018, Patent Application No. 13827419.6, filed Aug. 6, 2013, 3 pages.
European Communication under Rule 71(3) EPC mailed Nov. 20, 2018, Patent Application No. 13827419.6, filed Aug. 6, 2013, 75 pages.
Extended European Search Report mailed Mar. 5, 2018, European Patent Application No. 17196030.5, filed Oct. 11, 2017, 9 pages.
Gibson et al., "Directions for Shingled-Write and Two-Dimensional Magnetic Recording System Architectures: Synergies with Solid-State Disks (CMU-PDL-09-104)," Carnegie Mellon University Research Showcase, Parallel Data Laboratory, Research Centersand Institutes, pp. 1-3, May 1, 2009.
IEEE, "The Authoritative Dictionary of IEEE Standards Terms," Seventh Edition, 2000, p. 836.
International Search Report and Written Opinion mailed Feb. 14, 2014, in International Patent Application No. PCT/US2013/053828, filed Aug. 6, 2013.
International Search Report and Written Opinion mailed Feb. 14, 2014, International Patent Application PCT/US2013/053853, filed Aug. 6, 2013.
International Search Report and Written Opinion mailed Mar. 6, 2014, in International Patent Application No. PCT/US2013/053852, filed Aug. 6, 2013.
Jacobs et al., "Memory Systems, Cache, DRAM, Disk," Copyright 2007, Morgan Kaufman, 9 pages.
Japanese Notice of Allowance mailed Jan. 15, 2019, Patent Application No. 2017-080044, filed Aug. 6, 2013, 6 pages.
Japanese Notice of Rejection mailed Jul. 24, 2018, Patent Application No. 2017-080044, filed Aug. 6, 2013, 2 pages.
Japanese Official Notice of Rejection mailed Aug. 7, 2018, Patent Application No. 2017-152756, filed Aug. 6, 2013, 4 pages.
Japanese Official Notice of Rejection mailed Jun. 5, 2018, Patent Application No. 2017-094235, filed Aug. 6, 2013, 3 pages.
Korean Decision of Patent Grant mailed Nov. 27, 2018, Patent Application No. 10-2015-7005788, filed Aug. 6, 2013, 3 pages.
Korean Decision of Patent Grant, mailed Nov. 1, 2017, Patent Application No. 10-2017-7021593, filed Aug. 6, 2013, 3 pages.
Kozierok, "File Allocation Tables," The PC Guide, Apr. 17, 2001, retrieved Nov. 28, 2016, from http://www.pcguide.com/ref/hdd/file/fatFATs-c.html, 2 pages.
Massiglia, "The RAID Book: The Storage System Technology Handbook", 6th Edition, 1997, pp. 26-27, 84-91, 136-143, and 270-271.
Merriam-Webster, "Predetermine," Current Edition of Dictionary, retrieved Dec. 15, 2014, from www.merriam-webster.com/dictionary.
Micheloni et al., "Inside NAND Flash Memories," Springer First Edition (ISBN 978-90-481-9430-8):40-42, Aug. 2010.
Roos, "How to Leverage an API for Conferencing," Jan. 2012, from http://money.howstuffworks.com/businesscommunications/ how-to-leverage-an-api-for-conferencing1.htm, 2 pages.
Rosenblum et al., "The Design and Implementation of a Log-Structured File System," University of California at Berkley, ACM Transactions on Computer Systems 10(1):26-52, Feb. 1992.
Seagate, "Firmware Updates for Seagate Products," Feb. 2012, retrieved from http://knowledge.seagate.com/articles/en US/FAQ/207931en, 1 page.
Singaporean Second Invitation to Respond to Written Opinion and Second Written Opinion mailed Aug. 17, 2018, Patent Application No. 10201600997Y, filed Aug. 6, 2013, 6 pages.
Wikipedia, "Checksum," from Wayback/Wikipedia at en.wikipedia.org/wiki/checksum, retrieved Mar. 2011, 5 pages.
Wikipedia, "Error Correction," from Wayback/Wikipedia.org at en.wikipedia.org/wiki/Error-correcting.sub.-code, retrieved Sep. 2010, 7 pages.
Wikipedia, "Hash Tree," from Wikipedia.org at http://en.wikipedia.org/wiki/Hash.sub.-tree, retrieved Jul. 12, 2012, 1 page.
Wikipedia, "Process identifier," dated Sep. 3, 2010, retrieved Jul. 9, 2015, from https://en.wikipedia.org/w/index.php?title=Process_identifier&oldid=382695536, 2 pages.
Yu et al., "Exploiting sequential access when declustering data over disks and MEMS-based storage," Distributed and Parallel Databases vol./Issue 19(2-3):147-168, May 25, 2006.
European Communication Pursuant to Article 94(3) EPC mailed Nov. 15, 2019, Patent Application No. 17196030.5, filed Aug. 6, 2013, 6 pages.
Indian First Examination Report mailed Nov. 26, 2019, Patent Application No. 1689/DELNP/2015, filed Aug. 6, 2013, 6 pages.
Indian First Examination Report mailed Nov. 27, 2019, Patent Application No. 1686/DELNP/2015, filed Aug. 6, 2013, 7 pages.
Storer et al., "POTSHARDS—A Secure, Recoverable, Long-Term Archival Storage System," ACM Transactions on Storage, Published Jun. 2009, vol. 5, No. 2, Article 5, p. 5:1 to 5:35.
Singaporean Notice of Eligibility for Grant and Examination Report mailed Jan. 8, 2020, Patent Application No. 10201600997Y, filed Aug. 6, 2013, 5 pages.
Australian Examination Report No. 1 mailed Oct. 16, 2019, Patent Application No. 2018204309, filed Aug. 6, 2013, 5 pages.
Chinese Third Office Action mailed Aug. 30, 2019, Patent Application No. 201380042170.X, filed Aug. 6, 2013, 5 pages.
Indian First Examination Report mailed Aug. 26, 2019, Patent Application No. 1684/DELNP/2015, filed Aug. 6, 2013, 6 pages.
Australian Examination Report No. 3 for Standard Patent Application mailed Jun. 19, 2020, Patent Application No. 2018204309, 5 pages.
Australian Second Examination Report mailed Mar. 23, 2020, Patent Application No. 2018204309, filed Aug. 6, 2013, 4 pages.
Brazilian Office Action mailed Apr. 7, 2020, Patent Application No. BR1120150028373, 4 pages.
Canadian Office Action mailed Dec. 31, 2019, Patent Application No. 2881567, 3 pages.
Dimakis et al., "Network coding for distributed storage systems," IEEE Transactions on Information Theory 56 (9):4539-51, Aug. 16, 2010.
Chinese Notice on Grant of Patent Rights for Invention mailed Feb. 3, 2020, Patent Application No. 201380042170.X, filed Aug. 6, 2013, 2 pages.

(56) References Cited

OTHER PUBLICATIONS

Australian Examination Report No. 4 for Standard Patent Application mailed Sep. 1, 2020, Patent Application No. 2018204309, 4 pages.
Australian Examination Report No. 5 for Standard Patent Application mailed Oct. 1, 2020, Patent Application No. 2018204309, 3 pages.
Australian Notice of Acceptance for Patent Application mailed Oct. 17, 2020, Patent Application No. 2018204309, 3 pages.
Canadian Office Action mailed Jan. 29, 2021, Patent Application No. 2881567, 6 pages.
Extended European Search Report mailed Mar. 15, 2021, Patent Application No. 20197244.5, 11 pages.
Rosenberg, "On-Disk Authenticated Data Structures for Verifying Data Integrity on Outsourced File Storage," Jan. 1, 2000, 8 pages.
Canadian Office Action mailed Dec. 6, 2021, Patent Application No. 2881567, 5 pages.
European Article of Communication for Patent Application No. 20197244.5 dated Mar. 7, 2022, 8 pages.
Canadian Office Action mailed Jul. 16, 2020, Patent Application No. 2881490, 3 pages.
European Communication pursuant to Article 94(3) EPC mailed Sep. 28, 2020, Patent Application No. 17196030.5, 7 pages.
Brazilian Unfavorable Opinion for Patent Application No. BR1120150028373 dated Oct. 19, 2021, 11 pages.
Canadian Office Action mailed Sep. 26, 2022, Patent Application No. 2881567, 4 pages.
European Communication under Rule 71(3) EPC mailed Nov. 15, 2023, Patent Application No. 20197244.5, 101 pages.

\* cited by examiner

Location Index: 300

| Object Requested 302 | Storage Location 304 |
|---|---|
| "foo" | Archival Data Storage Device (ADSS) "AAA" |
| "bar" | ADSS "BBB" |
| "qux" | ADSS "VVV" |
| "bbb" | ADSS "AAA" |
| "ggg" | Local Storage Device "A" |
| "ppp" | Local Storage Device "B" |

FIG. 3

Pending Jobs Index: 400

| Time/Date 402 | Request ID 404 | Object Requested 406 | Storage Location 408 | Zone 410 | State 412 |
|---|---|---|---|---|---|
| 05:30 2015/03/03 | A001 | "foo" | ADSS "AAA" | 1 | Pending |
| 09:30 2015/03/04 | A002 | "bar" | ADSS "BBB" | 1 | Completed |
| 13:45 2015/03/05 | A003 | "qux" | ADSS "CCC" | 3 | Pending |
| 15:30 2015/03/06 | A004 | "ggg" | ADSS "AAA" | 1 | Pending |
| 17:20 2015/03/07 | A005 | "xyz" | ADSS "DDD" | 2 | Completed |
| 19:30 2015/03/08 | A006 | "foo" | ADSS "AAA" | 1 | Pending |

FIG. 4

SYNCHRONOUS GET COPY FOR ASYNCHRONOUS STORAGE

BACKGROUND

As the amount of digital information continues to increase, the demand for durable and reliable archival data storage services to store and retrieve digital information is also increasing. Archival data may include archive records, backup files, and media files maintained by governments, businesses, libraries, and the like. The archival storage of data has presented some challenges. For example, due to optimizations made to reduce costs for users of archival storage, the potentially massive amount of data to be stored in an archival data storage system can cause long periods of time before a user is able to retrieve the archival data from these archival data storage systems. The length of time it takes to retrieve data from archival storage can cause operational issues, such as unfulfilled requests due to dropped network connections among others. To overcome such issues often involves significant resources, such as resources involved in reconfiguring code to distinguish between data in synchronously available storage and asynchronously available storage.

BRIEF DESCRIPTION OF THE DRAWINGS

Various techniques will be described with reference to the drawings, in which:

FIG. 3 illustrates a location index used to identify the storage location of a requested data object, in accordance with at least one embodiment;

FIG. 4 illustrates a pending jobs index used to identify the progress associated with retrieving a data object, in accordance with at least one embodiment;

DETAILED DESCRIPTION

Figure 1:
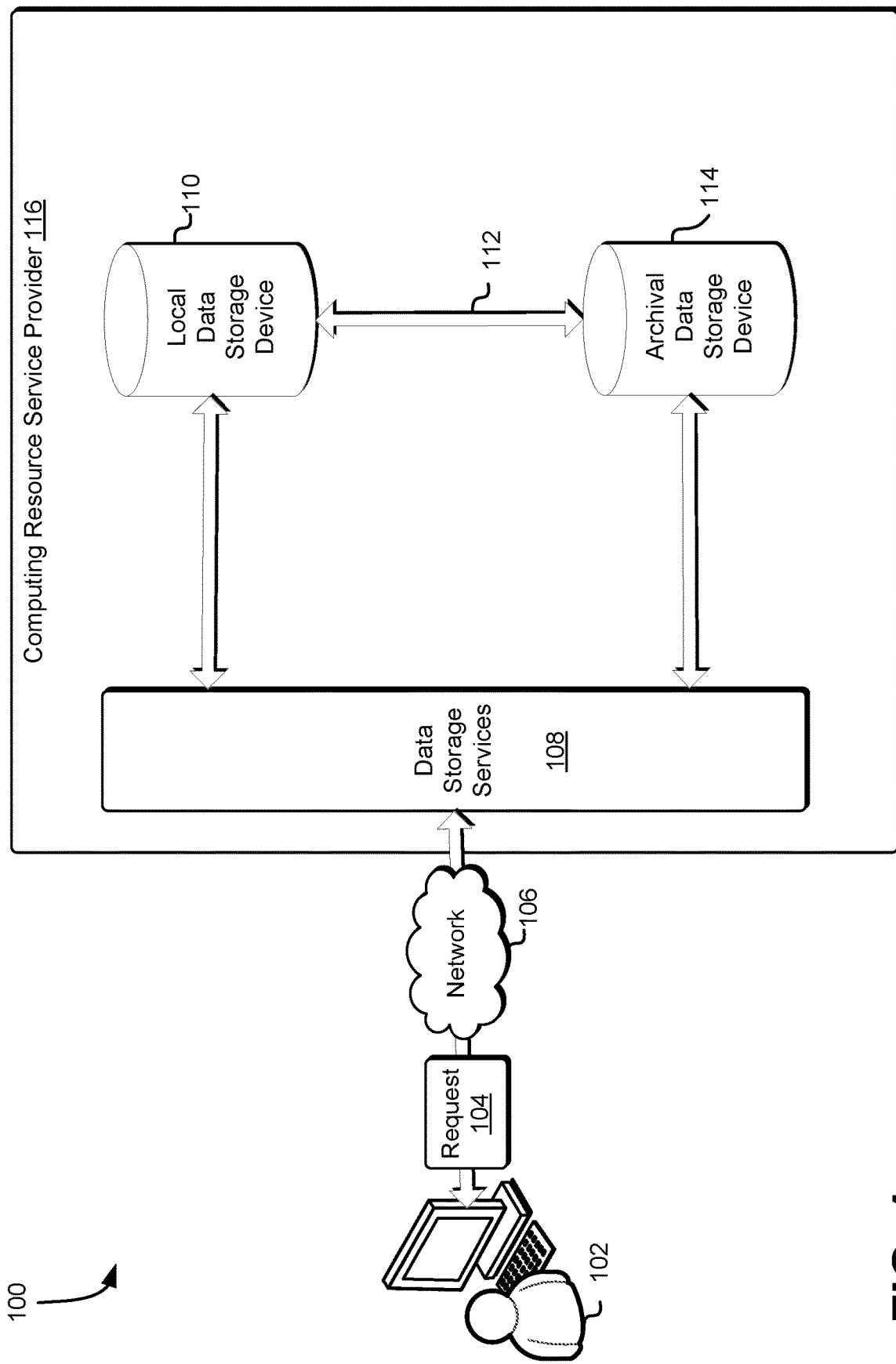
FIG. 1 illustrates an example environment between a computing device and a computing resource service provider, in accordance with at least one embodiment.

The present document describes a system and one or more methods for retrieving one or more data objects from a storage device. In an example implementation, the techniques described herein enable synchronous retrieval of data objects from data storage systems (e.g., archival data storage systems) that have asynchronous retrieval interfaces. In this manner, computer system code is simplified by avoiding the need to have different retrieval logic dependent on whether data objects are in data storage systems with synchronous interfaces or data storage systems with asynchronous interfaces.

In an example, a request (such as a web service application programming interface (API) request) from a computing device or requestor system includes information specifying the retrieval of one or more data objects that are stored in one or more archival data storage devices (e.g., data storage devices associated with an asynchronous-access storage service). The storage location of the data object may be identified by querying a location index based on information obtained from the request. Once a storage location has been identified, a retrieval job corresponding to the request may be created. The retrieval job may then be added to a collection of pending retrieval jobs (e.g., pending jobs index) that are waiting to be asynchronously processed. The collection may include one or more pending retrieval jobs to retrieve data objects from archival data storage devices that are located in various storage locations. The retrieval job, based on its job identification, may be compared with other pending retrieval jobs in the collection of pending retrieval jobs to determine whether a retrieval job for the same data object has already been created. If not, then the request for the one or more data objects is added to the collection of pending retrieval jobs. Subsequently, the processing of the retrieval jobs may be performed and data objects from these various storage locations may be retrieved. The retrieved data objects are then provided back to satisfy the request.

In an example, when the data object is retrieved from an archival data storage device (e.g., storage device associated with an asynchronous-access storage service), the data object is persistently written to a local location such as a local storage device (e.g., transient data store, temporary data storage device, or storage device associated with synchronous-access storage service) before being provided in response to the retrieval request for the data object. That is, the data object may be provided to a local storage device first and the retrieval request may then be satisfied by synchronously pulling the data object from the local storage device. The data object may be deleted from the archival data storage device. This way, from a user's perspective, the retrieval request is handled in a synchronous fashion instead of an asynchronous fashion. In another example, the data object retrieved from the archival data storage device may directly be provided to the user in response to the request without being persistently written to the local storage device. In some examples, the computing device may be directly provided with instructions to download the retrieved data object.

In some examples, the retrieved data object may be temporarily stored in the local storage device for a predetermined amount of time such that any subsequent requests for the same data object or portions of the data object may be satisfied by providing the data object to the computing device from the local data storage device. Moreover, in some examples, the local data storage device and the archival data storage device may be provided by at least two different storage services that are both configured to be executed in a computing resource service provider environment. The two different storage services may also be configured to communicate with one another over a network either through a wired or wireless connection. In some instances, however, the local data storage device and the archival data storage device may be provided using a single storage service.

Techniques described and suggested herein provide many technical advantages to the retrieval of data objects stored in from various archival data storage devices in a technical environment. Typically, the resources involved to pull a data object from the archival data storage service may require the data object to remain in the archival data storage device and then further require additional computing resources to store a copy in a local data storage device. This means that every subsequent request for that same object would require a relatively lengthy asynchronous retrieval to re-pull the data object from the archival data storage device. The techniques described herein would result in the requested data object being provided to the user without having to generate different computer code when using a storage service with an synchronous interface even though the data object is stored in an archival data storage device. Moreover, techniques described herein also would result in more efficient retrieval of data objects since the retrieved data objects are persistently written to a local data storage device such that any, subsequent requests for the same data object or portions of the same data object may be performed by retrieving the data object from the local data storage system synchronously. As a result of this, the amount of computing resources needed to retrieve archived data stored from archival data storage devices may be reduced.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an example environment 100 between a computing device 102 and a computing resource service provider 116, in accordance with at least one embodiment. The example environment 100 illustrates that a request 104 for data (e.g., data objects) may be obtained from a computing device 102 by a data storage service 108 executing within a computing resource service provider 116. In an embodiment, the request may be generated by the computing device 102 using an application programming interface (API) that is configured to receive user input/instructions for data object retrieval. In various embodiments, such as a user interface may include graphical user interfaces (GUIs), web-based interfaces, and/or sets of remote procedure calls (RPCs) corresponding to interface elements, messaging interfaces in which the interface elements correspond to messages of a communication protocol, and/or suitable combinations thereof. For example, a computing device 102 may use such a user interface to store, retrieve, or delete data objects as well as to obtain metadata information, configure various operational parameters and the like. Moreover, in an embodiment, the computing device 102 may send requests by sending API requests to the archival data storage system. Similarly, the archival data storage system may provide responses to the requests. Such requests and responses may be submitted over any suitable communications protocol, such as Hypertext Transfer Protocol ("HTTP"), HTTP 2.0, File Transfer Protocol ("FTP") and the like, in any suitable format, such as REpresentational State Transfer ("REST"), Simple Object Access Protocol ("SOAP") and the like. The requests and responses may be encoded, for example, using Base64 encoding, encrypted with a cryptographic key or the like.

In an embodiment, a computing device 102 configured to receive instructions from a user (referred herein sometimes as simply a "user device") initiates a request 104 to retrieve data objects, for example, using an API as described above. The retrieval request 104 may include identifier of the data object such as an archival file and metadata such as a size and digest of the data object, user identification information (e.g., user account identifier), an identifier of an archival data storage device, and the like. In some embodiments, multiple retrieval requests 104 may be used to request the retrieval of a large data object, where each of the multiple retrieval requests may include a portion of the data object. In other embodiments, a retrieval request 104 may include multiple data objects to be retrieved. The retrieval request 104, once generated, may be sent over a network 106, either via a wired or wireless connection, to a computing resource service provider 116, for example, using an API as described above. In various embodiments, network 104 may include the Internet, a local area network ("LAN"), a wide area network ("WAN"), a cellular data network and/or other data network.

The retrieval request 104 may be received by a data storage service 108 executing within a computing resource service provider 116. In some instances, the data storage service 108 may be configured with more than one storage service such that one storage service may be used to communicate separately with the local data storage device 110 and another storage service for the archival data storage device 114. The data storage service 108 may include tiered storage services such that data objects may be retrieved from different tiers of storage service. In a tiered storage service, the lowest tier storage service may provide slower access (e.g., slower retrieval) to the data objects compared to access times to retrieve data objects in a higher tier of a tiered storage service. In an embodiment, the local storage device 110 and the archival data storage device 114 may be executed in different computing resource service providers. In another embodiment, the local storage device 110 and the archival data storage service 114 may run locally in a data center. In an embodiment, the retrieval request 104 may be a GET request that specifies a data object identifier associated the data object to be retrieved. A GET request may be a representation of the specific resource. That is, a GET request may be a HTTP or HTTP 2.0 request that is used to retrieve data or data objects. Upon receiving retrieval request 104, in an embodiment, the data storage service 108 may determine whether the data object associated with the retrieval request 104 is located in a local data storage device 110 or an archival data storage device 114. Some of the embodiments associated with GET requests and how GET requests are processed are discussed in more detail in U.S. application Ser. No. 13/570,088, filed Aug. 8, 2012, now U.S. Pat. No. 9,767,098, issued Sep. 19, 2017, entitled "ARCHIVAL DATA STORAGE SYSTEM," the content of which is incorporated herein by reference in its entirety.

In some embodiments, the local data storage device 110 may be a storage device that is associated with a storage service with a synchronous retrieval interface (e.g., a synchronous-access data storage service) provided by the computing resource service provider 116. Typically, synchronously accessed data are stored in a storage device or storage system where data can be extracted or retrieved by a user device 102 by simply issuing a GET request. That is, a GET request is made and in response the data object is provided. Moreover, in some embodiments, the local data storage device 110 may be referred to as a high-frequency access storage device or high-performance object storage device.

In some embodiments, the archival data storage device 114 may be a storage device that is associated with a storage service with an asynchronous retrieval interface (e.g., an asynchronous-access data storage service) provided by the computing resource service provider 116. That is, over time, data objects that are considered old, cold, and/or outdated may be passed 112 from a local data storage device 110, which is configured to store or hold data objects for a predetermined amount of time, to the archival data storage device 114. Access to these data objects would then involve a request for an asynchronous pull. In an asynchronous pull, the retrieval request for the data object would generate a second request to process the retrieval request. That is, the retrieval request would be satisfied when the second request has been performed and the data object has been indicated as available. That is, the user device 102 would wait for the second request to be processed and after that, then be able to access the data object when a notification is received that the data object is ready for retrieval. Generally, the request for a data object stored in an archival data storage device 114 would require generating a second request that is added to a collection of pending retrievals. Based on the amount of pending retrievals, system configurations, and/or availability of system resources, it may take some time (e.g., one hour, three hours, or twenty-four hours, etc.) before the requested data object would be fully available, accessible, and/or retrievable from the archival data storage device 114. In some embodiments, the archival data storage device 114 may be referred to as a low-frequency access storage device or backup archival storage device.

If the data object is in the local data storage device 110, the data storage service 108 may provide the data object in response to the retrieval request 104 simply by retrieving the data object from the local data storage device 110. In some instances, the location of the data object may be made available to the user device 102 by providing download instructions for the data object.

If the data object is stored in an archival data storage device 114, however, the data storage service 108 may create a second request (e.g., retrieval job corresponding to the retrieval request 104) to retrieve the data object from the archival data storage device 114. That is, the request for the data object would not be available until the second request (e.g., retrieval job) has been completed. Specifically, in an embodiment, the storage service associated with the archival data storage device 114 processes the retrieval job in connection with other jobs (e.g., storage jobs, deletion jobs, and the like) using techniques such as batch processing to optimize costs. After the processing of the retrieval job, archival data storage device 114 may provide an indication that the data object is available. In an embodiment, the data storage service 108 may provide download instructions for the data object to the user device 102 in response to the retrieval request 104. In another embodiment, the data storage service 108 may also, while providing the data object back to the user device 102, persistently write or store the retrieved data object in a staging store, transient data store, or a local data storage device 110 for temporary storage while deleting the data object from archival data storage device.

In an embodiment, data storage service 108 provides a notification to user device 102 after the requested data is retrieved. Such notifications may be configurable by a user device 102 and may include a job identifier associated with the retrieval request 104, a data object identifier, a path to a download location, identity of the user or any other information that is used, according to the embodiment being implemented, to download the retrieved data object. In various embodiments, such notifications may be provided by a notification service (not depicted in FIG. 1) that may or may not be executed as a part of the computing resource service provider 116.

In an embodiment, upon detecting the completion of the retrieval job, user device 102 may send a download request (not depicted in FIG. 1) to download the data object. In various embodiments, download request may provide information included in the notification such as job identifier, data object identifier and other identifying information such as user account identifier that would be used, in the embodiment being implemented, to download the data object. In response to the download request, data storage service 108 may retrieve the data object from the local data storage device 110 and provide the retrieved data object to user device 102 in a response to the retrieval request 104.

Figure 2:
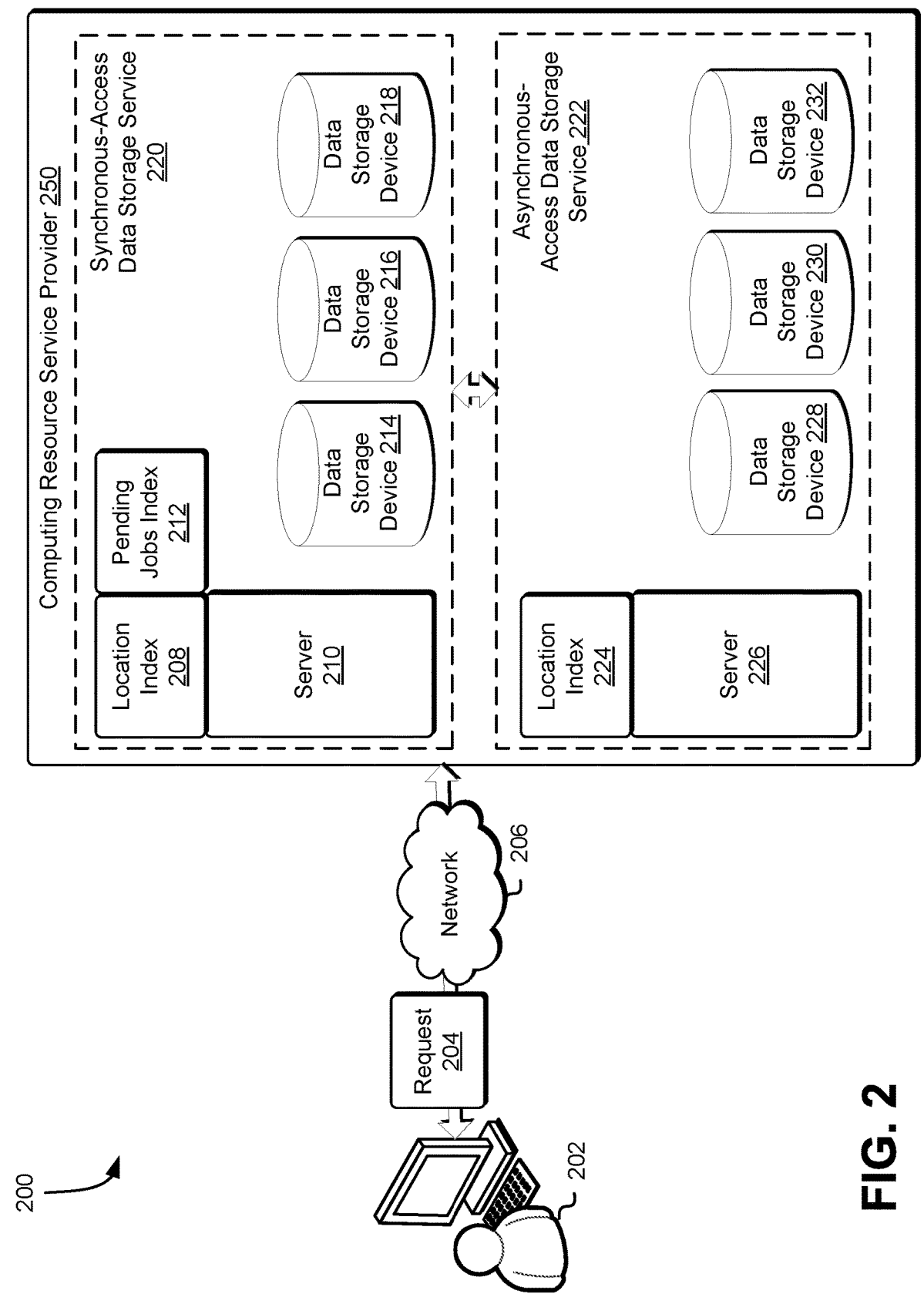
FIG. 2 illustrates an example environment in which synchronous-access and asynchronous-access data storage services may be implemented, in accordance with at least one embodiment.

FIG. 2 illustrates an example environment 200 in which a synchronous-access data storage service 220 (using a synchronous retrieval interface) and an asynchronous-access data storage service 222 (using an asynchronous retrieval interface) may be implemented, in accordance with at least one embodiment. One or more user devices 202 may connect, via a network 206, to a computing resource service provider 250. In an embodiment, a computing resource service provider 250 provides an environment where one or more user devices 202 may store, retrieve, delete or otherwise manage data objects in a data storage space allocated to the one or more user devices 202. In some embodiments, a computing resource service provider 250 includes a synchronous-access data storage service 220 that includes a location index 208, a server 210, a pending jobs index 212, and a fleet of data storage devices 214-218. The fleet of data storage devices 214-218 associated with synchronous-access data storage service 220 may also, in some instances be referred to as simply local data storage devices, local data storage systems, high-frequency access storage devices, or high-performance object storage devices.

Once connected, the one or more user devices 202 may generate and send a request 204 to retrieve data, portions of data, and/or one or more data objects from a storage device. The request may be a GET request and received by the server 210 of the synchronous-access data storage service 220, which may obtain information (e.g., data object identifier) from the request to generate a response. The server 210 may analyze the information from the request 204 and determine whether to generate a response to the request 204. The server 210, in association with a location index 208, may further identify where the requested data object is currently located or stored. That is, based on the data object identifier in the request and the location index 208 (which is described in more detail with respect to FIG. 3), the server 210 may determine the storage location of the requested data object. In some instances, the requested data object may not be stored in any of the storage devices associated with the computing resource service provider 250, and thus a response may be returned to the one or more user devices 202 indicating that the requested data object cannot be retrieved. Alternatively, the response may be returned to the one or more user devices 202 indicating that the requested data object cannot be retrieved, but other data objects with similar data object identifiers are available for retrieval.

In some instances, the server 210, in connection with the location index 208, may determine that the requested data object is currently stored in one or more data storage devices 214-218 associated with the synchronous-access data storage service 220. As such, the data object may be retrieved from one or more of the data storage devices 214-218 by providing the data object synchronously. That is, the request would be satisfied by providing the data object from the local data storage device or instructions to download the data object. Although FIG. 2 illustrates three data storage devices 214-218 associated with the synchronous-access data storage service 220, it may be noted that this is for illustrative purposes, as there may be more or less than three data storage devices in different computing environments.

In some instances, however, the requested data object may not be stored in data storage devices 214-218 but rather stored in a fleet of data storage devices 228-232 associated with an asynchronous-access data storage service 222. In some embodiments, as noted above with respect to FIG. 1, the fleet of data storage devices 228-232 associated with the asynchronous-access data storage service 222 may be referred to as simply archival data storage systems, archival data storage devices, low-frequency access storage devices, or backup archival storage devices. Based on this, the server 210 of the synchronous-access data storage service 220 may communicate with the server 228 of the asynchronous-access data storage service 222 to retrieve the requested data object.

As such, the server 210 of the synchronous-access data storage service 220 may determine whether the request for the same data object is already pending in a pending jobs index 212. A pending jobs index 212 includes information about job retrievals for data objects stored in archival data storage devices. The synchronous-access data storage service may determine to submit the request to an asynchronous-access data storage service for data object retrieval and add the request to the pending jobs index if the pending jobs index 212 does not currently have the request for the same data object pending. After adding the request to the index 212, the pending jobs index 212 may be updated to reflect as such. On the other hand, if the pending jobs index 212 indicates that there is currently a pending retrieval job that has a request pending for the same data object then the pending jobs index 212 may also be updated by simply adding a pending job retrieval associated with the request to the list of pending jobs but does not submit the request for the data object to the asynchronous access data storage service 222. The pending jobs index (which is described in more detail with respect to FIG. 4 below) may include information such as: a job retrieval identification (ID), an object request ID, a date/time the request 204 was made, information pertaining to the requested data object, the location/zone of the data storage device, and/or the state of the job retrieval.

When the request has been submitted to an asynchronous-access data storage service and added to a pending jobs index 212 (or in some instances referred to as a collection of pending job retrievals), the server 226 may process a batch or a bunch of requests to retrieve data objects stored in a fleet of data storage devices 228-232 associated with the asynchronous-access data storage service 222. Again, the data storage devices 228-232 illustrated in FIG. 2 is just an example embodiment of the amount of data storage devices that may be associated with asynchronous-access data storage service. As such, in some instances, there may be more or less than three data storage devices associated with the asynchronous-access data storage service 222.

The location index 224 of the asynchronous-access data storage service 222 may provide information of where the requested data objects are stored. The location index 224 may also indicate the storage location zones of where the data storage devices 228-232 are located. A zone may indicate a geographic location or a combination of different geographical locations of storage devices. A zone may also indicate a collection of storage devices that are related and/or geographically placed in the same zone.

As noted previously, the synchronous-access data storage service 220 and the asynchronous-access data storage service 222 may communicate with one another such that requests may be passed on from the synchronous-access data storage service 220 to the asynchronous-access data storage service 222 for retrieval of a data object that is stored in one of data storage devices 228-232. When the data object has been retrieved from one or more of the data storage devices 228-232 associated with the asynchronous-access data storage service 222, the server 226 may indicate to the synchronous-access data storage service 220 that the request for the data object has been satisfied. The data object may be provided to fulfill all the requests in the pending jobs index 212 for the data object. A notification may be sent to the synchronous-access data storage service's 220 server 210 and the data object may then be stored in any one of the data storage devices 214-218 associated with the synchronous-access data storage service 220.

In some instances, the data object may not be provided and stored in the data storage devices 214-218 associated with the synchronous-access data storage service 220 and simply be provided to the server 210 so that the user device 202 may be notified that the data object is ready for download. In other words, the server 210 may inform the user device 202 and send information pertaining to a path to download the data object from the data storage devices 228-232. However, in other instances, based on system configurations and/or user-defined policies, and as described in detail above, the retrieved data objects may be provided to or persistently written to the data storage devices 214-218 in the synchronous-access data storage service 220 first while deleting the data object from the data storage devices 228-232. The request is then satisfied by downloading the data object from the synchronous-access data storage service 220 synchronously. In some instances, the data object may be stored in data storage devices 214-218 for a predetermined period of time in the event additional requests are received for the same data object. However, after the predetermined period of time has lapsed, the data object may then be life-cycled or transferred back to data storage devices 228-233 from data storage devices 214-218 for archival storage. In other instances, the data object may be provided by writing a copy of data object to data storage devices 214-218 while also keeping the data object in data storage devices 228-232 such that when additional requests are received, the additional requests may be satisfied by providing the data object from either data storage devices 214-218 or data storage devices 228-232.

FIG. 3 illustrates a location index 300 used to identify the storage location of a requested data object, in accordance with at least one embodiment. In an embodiment, a location index 300 may be used to obtain information about the storage location of a data object. Specifically, the location index 300 may indicate based on information from the data object's identifier the storage location 304 associated with that requested data object 302. For example, and as illustrated in FIG. 3, when a request for a data object is received by a storage service as provided by a computing resource service provider, the location index 300 may indicate whether the data object, based on its identifier, is stored in a local storage device labeled "A" or whether the data object is stored in an archival data storage device ("ADSS") such as one that is labeled as "AAA." Specifically, when a data object request 302 indicates a data object pertaining to "foo," the location index 300 may provide information that the "foo" data object is in an archival data storage device labeled "AAA." In an embodiment, the location index 300 may be updated when a data object has been retrieved from an archival data storage device and persistently written to the local storage device. For example, if the "foo" object requested has been asynchronously pulled from the archival data storage device "AAA" and has been written to a local storage device labeled "A," the location index may be updated to indicate as such.

As discussed with respect to FIGS. 1 and 2, and further with respect to FIGS. 5-8, the archival data storage devices may be a part of the asynchronous-access data storage service, where these devices are configured to store cold, old, or archived data that are transferred from local data storage devices. To determine whether data is considered cold, old, or archived, the system may utilize various user-defined rules, system storage policies, and/or machine-learning algorithms to determine when to transfer data from the local storage device to an archival data storage device. In some instances, and as illustrated in FIG. 2, the location index 300 may also be used by an asynchronous-access data storage service where the location index 300 may simply indicate which archival data storage device currently stored which data objects. In other words, the location index associated with the asynchronous-access data storage service (not depicted) may contain different information than the location index associated with the synchronous-access data storage service as illustrated in FIG. 3.

FIG. 4 illustrates a pending jobs index 400 used to identify the progress associated with retrieving a data object, in accordance with at least one embodiment. In an embodiment, a pending jobs index 400 (or sometimes referred to as a collection of pending retrieval jobs) may be used by a storage service with a synchronous retrieval interface (e.g., a synchronous-access data storage service) to determine whether requests for data objects (e.g., job retrievals for a particular data object) is currently pending. For example, if the synchronous-access data storage service receives a request to retrieve a data object and the data object is not currently stored in a local storage device, the synchronous-access data storage service may submit the request to the pending jobs index 400 (e.g., create a job retrieval corresponding to the request) and add it to a pending jobs index 400.

The pending jobs index 400 may include information such as request ID 404 so that the system may map the request to the process that is waiting for the object. In other words, when a data object is returned from the archival data storage device, the request ID will determine which processes will get that object so that synchronous responses will eventually be given. Additionally, the pending jobs index 400 may also include information such as a time/date 402 that a data object request was submitted. The pending jobs index 400 may also include information such as the object requested 406, a storage location 408 of the data object, a storage zone 410 that the archival data storage device is located in, and a state 412 of the pending job retrievals. The state 412 of the pending jobs may indicate whether job retrievals have been completed or not. Based on a successful retrieval of a data object, the state 412 in the pending jobs index may be updated updating the state from "pending" to "completed." In an embodiment, the pending jobs index 400 may also be updated, after completion of a data object retrieval job, by removing the requested data object in the pending jobs index 400. In some instances, the pending jobs index 400 may include more or less object request information than the index illustrated in FIG. 4.

Figure 5:
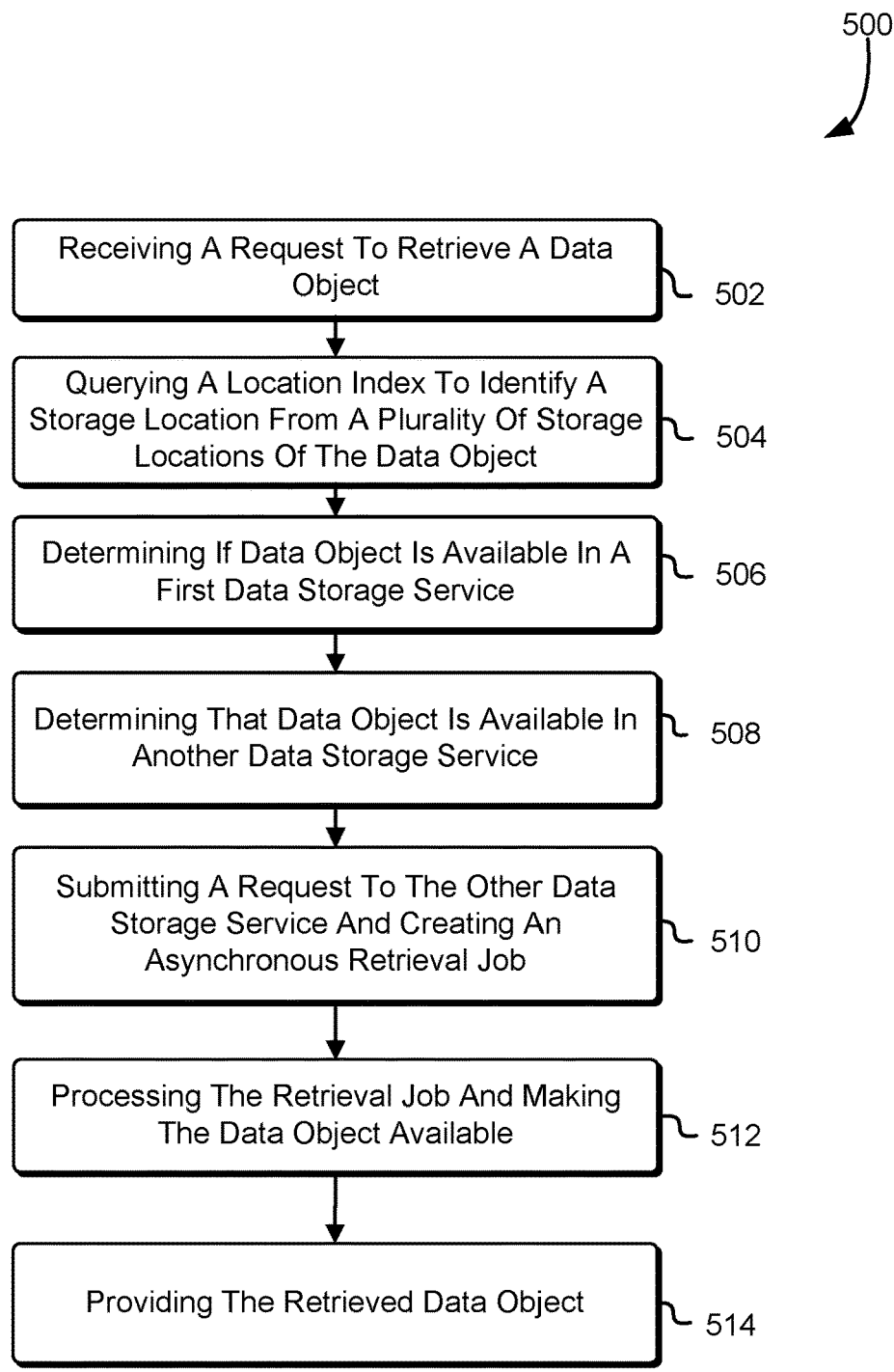
FIG. 5 illustrates a process for retrieval of a data object stored in a storage device, in accordance with at least one embodiment.

FIG. 5 illustrates a process 500 for retrieval of a data object stored in a storage device, in accordance with at least one embodiment. The process 500 may be performed by data storage services and/or computing systems provided by a computing resource service provider as described in FIG. 1. In 502, a request to retrieve a data object stored in a data storage device/service is received. The request may be a GET request generated by a computing device seeking to access, obtain, or retrieve archival data objects. Request parameters may include parameters such as response to content type, container, bucket, object, and the like. For example, a request parameter for content type may be the type of data object to be requested. In another example, the request parameter for container or bucket may be a unique name for the container or bucket that holds the data object. In another example, the request parameter for object may be the data object name or identifier. Response parameters may include, restore, trans-id, timestamp, and the like. In an example, the response parameter for restore may provide information about the object restoration operation and expiration time of the restored object copy. In another example, the response parameter for trans-id may be a unique transaction ID for the data object request. In yet another example, the response parameter for timestamp may be a data/time (UNIX Epoch time format) when the request for a data object was requested.

Once the request is received, the request may be processed by a server associated with a synchronous-access data storage service provided by a computing resource service provider to analyze the contents of the request. The synchronous-access data storage service may query a location index, as shown in 504, to identify a storage location of the requested data object. There may be a plurality of storage locations and some storage locations may be local and some may be located at another data storage service. In some instances, the request may contain a data object identifier and the synchronous-access data storage service may utilize the data object identifier in connection with a location index to determine where and if the data object can be retrieved.

In 506, the synchronous-access data storage service may determine whether the data object is in any of the local data storage devices. If so, the data object may be provided synchronously. That is, in some embodiments, the data object that a computing device is requesting may already be stored in a local data storage device or a local location associated with a first/synchronous-access data storage service. As such, the synchronous-access data storage service may indicate to the computing device in response to the request the location of the data object and provide information for the computing device to download the data object from one or more local data storage devices.

In 508, however, if it is determined that the data object is available in another storage device/service, the request may be submitted to the other data storage service and be added to a collection of pending retrieval jobs (e.g., pending jobs index). That is, the first/synchronous-access data storage service may determine that the data object is actually stored in an archival data storage device associated with a second/asynchronous-access storage service provided by the computing resource service provider. As such, the synchronous-access data storage service submits the request to the second storage service and adds the request to the pending jobs index 510. In some instances, multiple requests to the synchronous-access data storage service may also cause the generation of multiple retrieval jobs. The multiple requests, if all indicate the same data object or portions of the same data object, may be consolidated into a single request before being adding to the pending jobs index.

If it is determined that the requested data object is already a pending request or job in the pending jobs index (e.g., a collection of pending retrieval jobs or a collection of data retrieval jobs), a determination can be made that the request is not submitted to the asynchronous-access data storage service but rather the job retrieval associated with the request is simply added to the pending jobs index. This way, when the requested data object is returned from an archival data storage device and made available, the pending jobs index would still be able to provide information as to which job retrievals associated with the requested data object can be satisfied using the retrieved data object. The pending jobs index, as described with respect to FIG. 4 above, may include information such as a time/date the request was submitted, a request ID, the object requested, storage locations of the object requested, the zone of the storage locations, and/or a state of the current pending job retrievals.

Again, if it is determined that, based on information from the pending jobs index, the request has not been submitted to an asynchronous-access data storage service in 510, the synchronous-access data storage service may submit the request to another or a second storage service such as an asynchronous-access data storage service and the pending jobs index may be updated accordingly. That is, the synchronous-access storage service submits the request to the asynchronous-access storage service and does not receive the requested data object right away, but rather waits until a collection of requests have been processed before the data object is retrieved. The pending jobs index 500 may be a listing of pending that may or may not ordered based on time/date, type of object requested, and/or other types of information.

The collection of pending retrieval jobs in the pending jobs index may be processed either in batches or in bunches in a cost-effective manner. The process, using the asynchronous data storage service, may be completed by going through the collection of pending retrieval jobs and retrieving the data objects asynchronously. The data objects may be retrieved from archival data storage devices location in various different geographical regions and/or zones. In 512, once the collection of pending retrieval jobs have been processed, the data object may be made available.

In 514, the retrieved data object may then be provided to satisfy the request after the collection or portions of the collection have been completed. In some instances, the state of each of the job retrievals may be changed from "pending" to "completed" once the data objects have been retrieved accordingly. In other words, the collection of pending retrieval jobs may be updated based on the system processing these pending retrieval jobs for the requested data object(s). In some instances, the data object is provided back to the computing device by simply transferring the data objects to the computing device or providing instructions for the computing device to download the data object. Alternatively, the data object may be retrieved from the archival data storage device and be persistently written to a temporary storage location such as a local data storage device associated with the synchronous data storage service provided by the computing resource service provider. The local data storage device may store the data object and thereby cause the data object to be downloaded from the local storage device synchronously in an effort to satisfy the request. Additionally, in some instances, an additional request (e.g., a second GET request) for the same data object may also be received by the synchronous data storage service, and the additional request would thus be satisfied by retrieving the data object from the local storage device synchronously.

Figure 6:
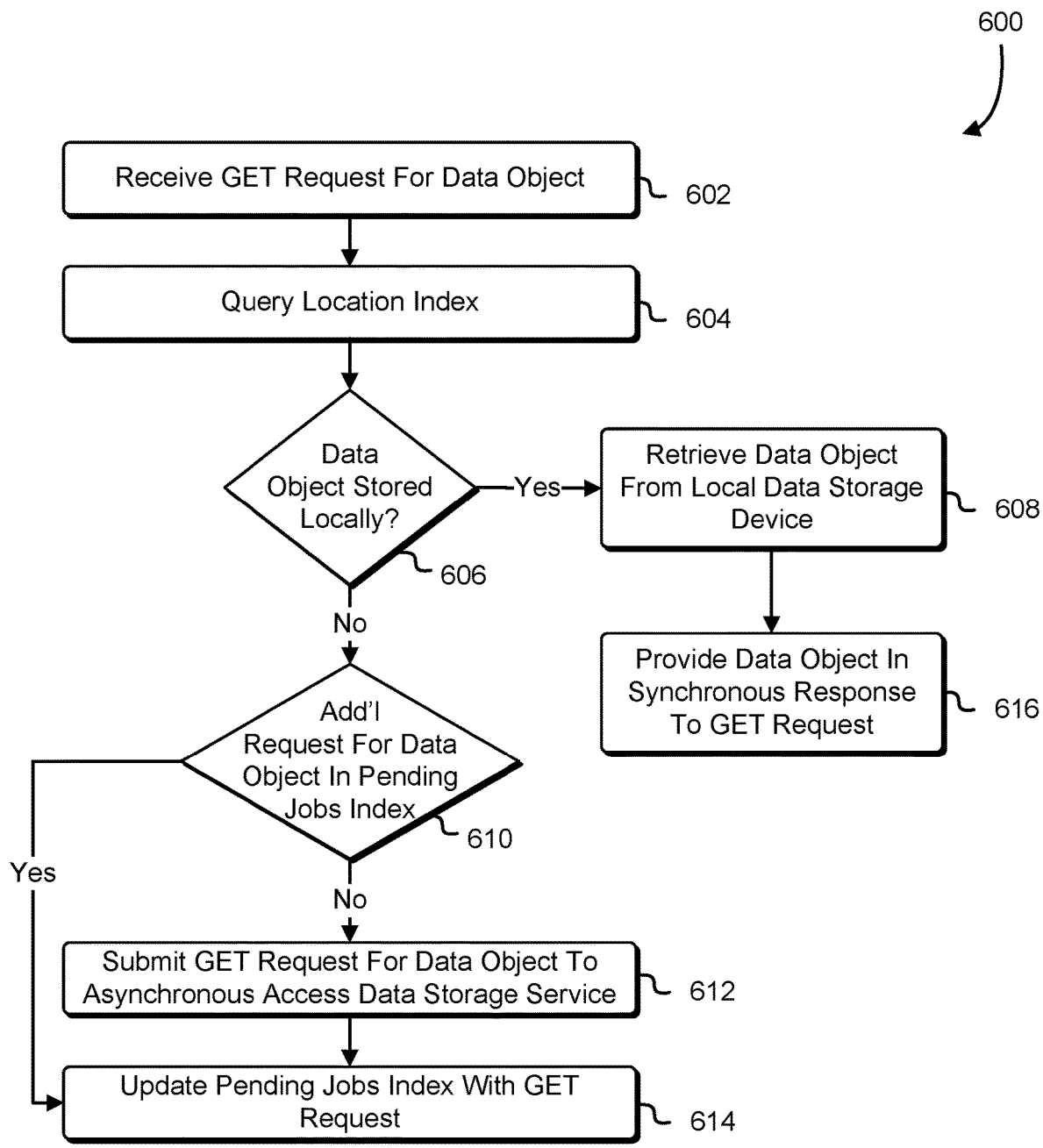
FIG. 6 illustrates a process for locating a data object and the retrieval of the data object in accordance with at least one embodiment.

FIG. 6 illustrates a process 600 for processing a request for a data object such as described in connection with FIG. 1, and in accordance with at least one embodiment. The process 600 may receive a request for a data object from a computing device 602. The request may be a GET request (a type of HTTP or HTTP 2.0 request) for a data object. The GET request for the data object is received by a storage service using a synchronous retrieval interface (e.g., synchronous-access data storage service) provided by a computing resource service provider. The synchronous-access data storage service may first receive the GET request and query a location index 604 to determine the data object's location. The location index may indicate where a requested data object is stored. That is, the GET request may contain information such as a data object identifier that identifies a data object to be retrieved. By using the data object identifier in connection with a location index, a storage location pertaining to the data object may be identified. In some instances, the storage location may be a local data storage device associated with the synchronous-access data storage service. Hence, a determination 606 may be made whether the data object is actually stored locally. If so, under 608, the data object identified in the GET request would be retrieved from a fast and local data storage device to fulfill the request both quickly and synchronously. That is, the data object would be provided in a synchronous response to the GET request 616.

In some embodiments, if the object identified in the GET request is not stored locally then a determination is made as to whether there is a pending request for the same data object 610. In some embodiments, a pending jobs index may be a list of data object retrieval requests from archival data storage devices that are currently pending. Using the pending jobs index, the request for the data object identified in the GET request would then be compared against other job retrievals to determine 610 whether there are any pending requests for the same data object. This may be performed by searching the pending jobs index using the identifier of the data object requested in the GET request and comparing the identifier with other data object identifiers associated with pending requests. If so, then the pending jobs index will be updated 614 to simply add a job retrieval associated with request to the index so that when the requested data object is made available for response, the job retrievals associated with the request and all other requests for the data object may be satisfied. If not, however, the GET request will be submitted to a storage service using an asynchronous retrieval interface (e.g., asynchronous-access data storage service) 612 and the pending jobs index will be updated with the GET request 614.

Figure 7:
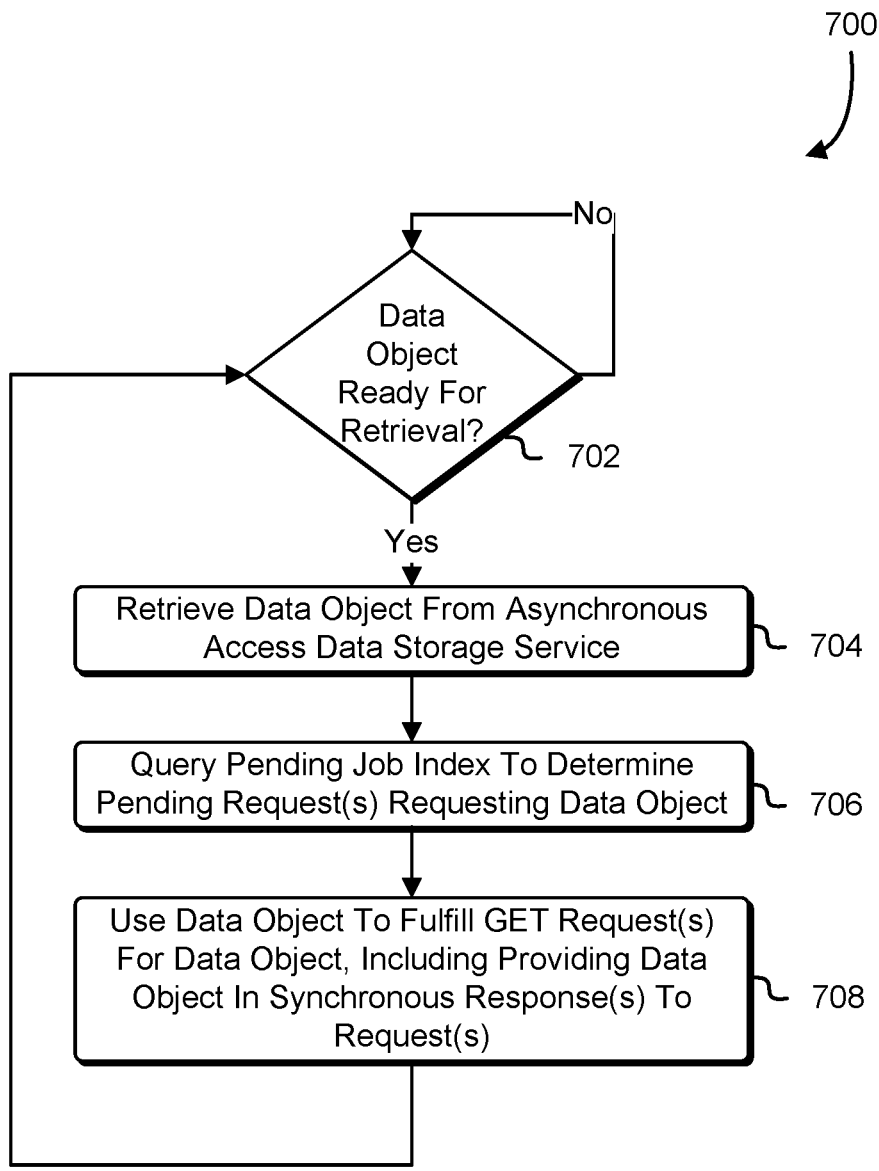
FIG. 7 illustrates a process for determining whether a data object is ready for retrieval and performing operations to retrieve the data object in accordance with at least one embodiment.

FIG. 7 illustrates a process 700 for determining whether a data object is ready for retrieval and performing operations to retrieve the data object as described in connection with FIG. 1, in accordance with at least one embodiment. In an embodiment, the process 700 is an extension of the process 600 in FIG. 6. That is, a determination is made as to whether the request data object from an archival data storage service is ready for retrieval 702. In an embodiment, a data object is ready for retrieval when a pending jobs index and the requests associated with the index are processed, either in batches or bunches. Once the data object is retrieved from the data storage devices associated with the asynchronous-access data storage service 704, the pending job index may be queried such that a determination can be made as to whether all other pending requests (e.g., job retrievals) for the same data object 706 have been satisfied. If so, then the pending jobs index may be updated to indicate as such after the requested data object has been retrieved. Moreover, once the requested data object has been retrieved, the data object may then be used to fulfill the GET requests for that specific data object 708 synchronously. As mentioned above, the asynchronous-access data storage service may provide the data object directly back to the computing device that requested it or, in some instances, the asynchronous-access data storage service may first persistently write or store the data object in a local storage device. If the data object is stored in the local storage device for some time, the data object may then be provided to response to any subsequent GET requests for that same data object or portions of the that same data object synchronously.

Figure 8:
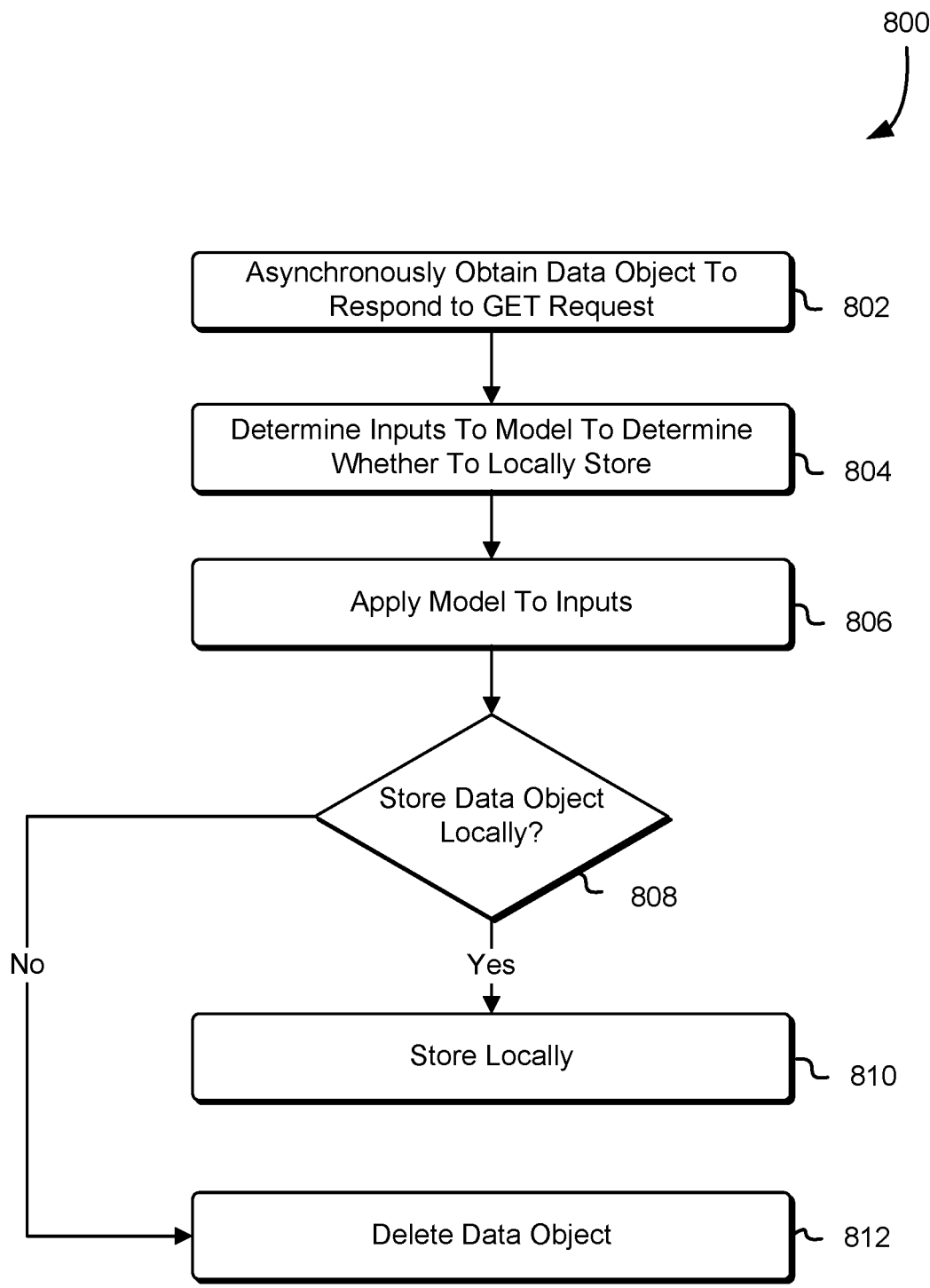
FIG. 8 illustrates a process for determining whether to store a data object in a storage device in accordance with at least one embodiment.

FIG. 8 illustrates a process 800 for determining whether a retrieved data object from an archival data storage device is written to a local storage device in accordance with at least one embodiment. For example, after a data object has been obtained in response to a GET request from a data storage device associated with an asynchronous-access data storage service 802, a determination can be made whether to locally store the retrieved data object in a local storage device 804 using a model. The model and the inputs to the model can be determined based on user-defined instructions and/or system policies. In some embodiments, the model may be a probabilistic model, a supervised model, a neural network, random forest, decision tree, and the like. For example, the model may be trained using machine-learning techniques based on data that indicates whether previous GET requests were directed to the same data object twice in a specified timespan or, in some instances, based on the amount of time between GET requests for the same data object. In some instances, the inputs may be a customer ID, a user ID, user-specified tags associated with the data object, and/or other data object metadata (e.g., size, file type, etc.). Once the inputs to the model have been determined, the model may then be applied to the inputs 806 and a decision whether to store the retrieved data object locally 808 can be made. If the model results in an indication that a subsequent GET request for the same data object would be generated by a computing device soon or within a certain timeframe (e.g., within three days), the data object may be stored locally 810 so that subsequent GET requests would return the data object in a synchronous response. If not, under 812, the data object may be deleted 812. That is, if the model results in an indication that subsequent GET requests for this same data object would most likely not be received for long period of time (e.g., one month), then the data object retrieved may be deleted.

In some instances, the model could indicate how long the local data storage device could store the retrieved data object. For example, the model could be a classifier where the possible classifications are amounts of time to store in the local data storage device (e.g., possibly zero time). This way, the local data storage device doesn't store the data object longer than needed (to save on computational resources and monetary expense associated with storing data in a local data storage device that may be more expensive than storing data in an archival data storage device). The model may also optimize cost based on cost of storage in each system versus of cost of the GET requests since GET requests for an archival data object may be more expensive.

Figure 9:
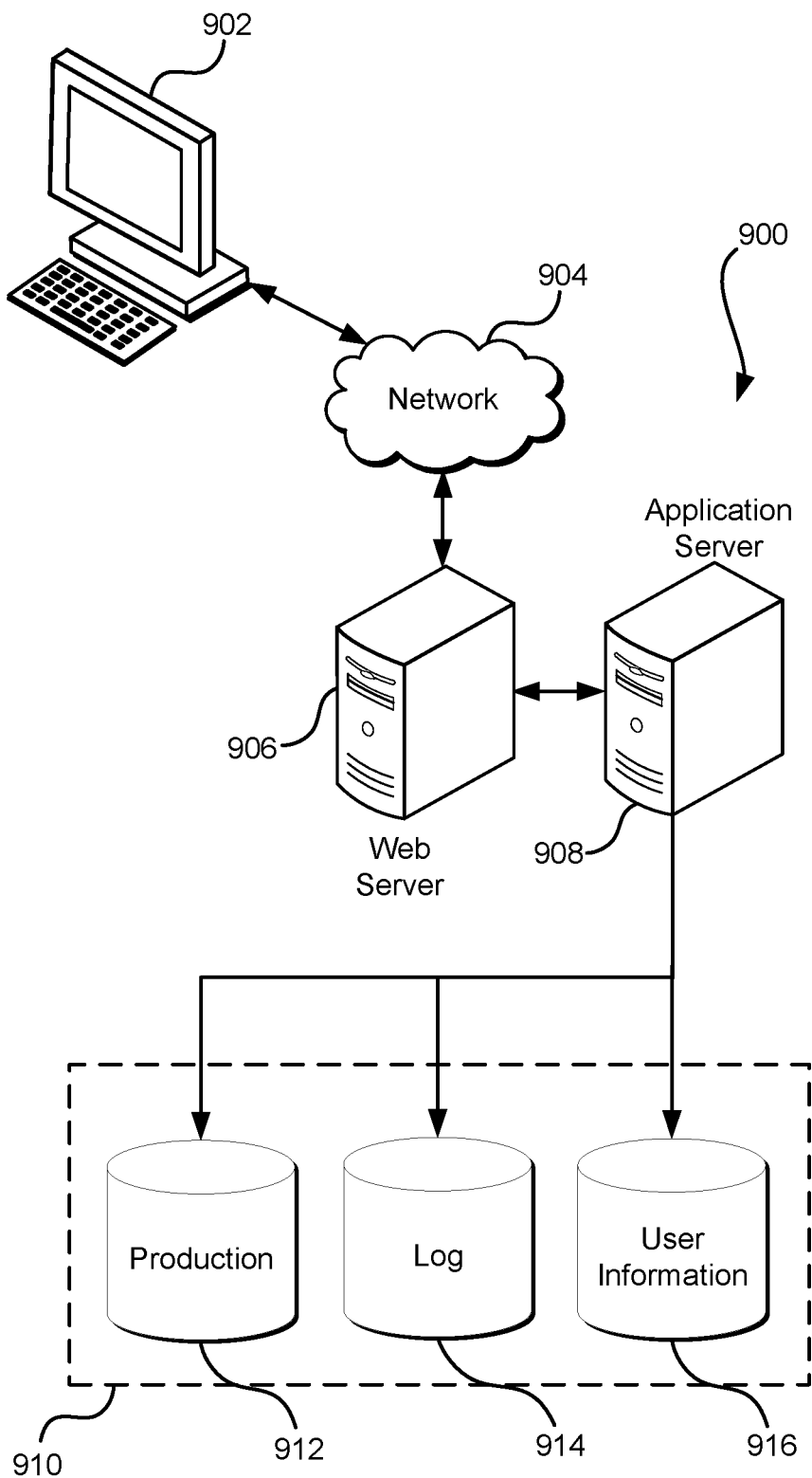
FIG. 9 illustrates an environment in which various embodiments can be implemented.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular, or other mobile phones, hand-held messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network, or any other such network and/or combination thereof and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910 and it should be understood that there can be several application servers, layers, or other elements, processes, or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered system. Data stores, in an embodiment, communicate with block-level and/or object level interfaces. The application server can include any appropriate hardware, software, and firmware for integrating with the data store as needed to execute aspects of one or more applications for the client device, handling some or all of the data access and business logic for an application.

In an embodiment, the application server provides access control services in cooperation with the data store and generates content including, but not limited to, text, graphics, audio, video, and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including, but not limited to, forms that are perceptible to the user audibly, visually, and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes, and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis, or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive computer-executable instructions from the application server 908 and obtain, update, or otherwise process data in response thereto and the application server 908 provides static, dynamic, or a combination of static and dynamic data in response to the received instructions. In an embodiment, dynamic data, such as data used in web logs (blogs), shopping applications, news services, and other such applications are generated by server-side structured languages as described herein or are provided by a content management system ("CMS") operating on, or under the control of, the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed (i.e., as a result of being executed) by a processor of the server, cause or otherwise allow the server to perform its intended functions.

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. In an embodiment, user or client devices include any of a number of computers, such as desktop, laptop, or tablet computers running a standard operating system, as well as cellular (mobile), wireless, and handheld devices running mobile software and capable of supporting a number of networking and messaging protocols and such a system also includes a number of workstations running any of a variety of commercially available operating systems and other known applications for purposes such as development and database management. In an embodiment, these devices also include other electronic devices, such as dummy terminals, thin-clients, gaming systems, and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that run one or more of a variety of server or mid-tier applications, including HTTP servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C#, or C++, or any scripting language, such as Ruby, PHP, Perl, Python, or TCL, as well as combinations thereof. In an embodiment, the one or more servers also include database servers, including without limitation those commercially available from Oracle®, Microsoft®, Sybase®, and IBM®, as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above which can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood with the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, a non-transitory computer-readable storage medium store instructions and a main CPU execute some of the instructions while a graphics processor unit executes other instructions. In an embodiment, different components of a computer system have separate processors and different processors execute different subsets of the instructions.

Accordingly, in an embodiment, computer systems are configured to implement one or more services that singly or collectively perform operations of processes described herein and such computer systems are configured with applicable hardware and/or software that enable the performance of the operations. Further, a computer system that implement an embodiment of the present disclosure is a single device and, in another embodiment, is a distributed computer systems comprising multiple devices that operate differently such that the distributed computer system performs the operations described herein and such that a single device does not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
receiving, over a network from a requestor system and at a first interface for a data storage service, a first request to retrieve a data object;
querying a location index, based on information from the first request, to identify a storage location of the data object from a plurality of locations that comprises a local location and a location at another data storage service;
as a result of determining that the data object is available via the other data storage service, submitting a second request to a second interface of the other data storage service to create an asynchronous retrieval job to be added to a pending jobs index to retrieve the data object from the other data storage service, wherein the first interface is a synchronous retrieval interface for the data storage service and the second interface is an asynchronous retrieval interface for the other storage service are different;
as a result of detecting that the response to the asynchronous retrieval job has indicated that the data object is available to be retrieved, using information from the response to obtain the data object;
providing the data object from the other data storage service to the local location such that the data object is persistently written to the local location; and
synchronously pulling the data object from the local location in response to the first request.

2. The computer-implemented method of claim 1, wherein providing the data object includes persistently writing the data object to the local location associated with the requestor system.

3. The computer-implemented method of claim 2, further comprising:
receiving a third request for the data object;
querying the location index based on information from the third request;
determining that the data object is located in the local location; and
providing the data object from the local location.

4. The computer-implemented method of claim 2, further comprising updating the location index when the data object is written to the local location.

5. A system, comprising:
one or more processors; and
memory that stores computer-executable instructions that, as a result of being executed, cause the system to:
receive, at a first interface for a first data storage service, a request for a data object, wherein the first interface receives synchronous retrieval requests for data objects;
as a result of the data object being unavailable from a first set of locations that provide synchronous access to data objects, but available at a second set of locations that provide asynchronous access to the data object, submit a second request to a second interface to be added to a pending jobs index for the second set of locations and upon receiving a response comprising information to obtain the data object from a location in the second set of locations, using the information to obtain the data object;
wherein the second interface is different from the first interface and receives asynchronous retrieval requests for data objects;
persistently write the data object to a location in the first set of locations; and
provide the data object from the location in a synchronous response to the request.

6. The system of claim 5, wherein the computer-executable instructions further cause the system to download the data object based on a notification that the data object is available for retrieval.

7. The system of claim 5, wherein the computer-executable instructions further cause the system to query a location index to determine the location of the requested data object.

8. The system of claim 5, wherein the computer-executable instructions further cause the system to provide the data object from the first set of locations based on a determination that the data object is available from the first set of locations.

9. The system of claim 5, wherein the computer-executable instructions further cause the system to query a collection of pending requests in a pending jobs index to determine whether a request for retrieval of the same data object from a location in the second set of locations is pending.

10. The system of claim 9, wherein the computer-executable instructions further cause the system to submit the second request for the data object to the second set of locations based on a determination that the request for retrieval of the same data object is not pending.

11. The system of claim 5, wherein the computer-executable instructions further cause the system to persistently write the data object to the location in the first set of locations after obtaining the data object from the location in the second set of locations.

12. The system of claim 11, wherein the computer-executable instructions further cause the system to write the data object from the first set of locations to the second set of locations after a predetermined amount of time.

13. A non-transitory computer-readable storage medium having stored thereon executable instructions that, as a result of being executed by one or more processors of a computer system, cause the computer system to at least:
receive, at a synchronous interface for a first data storage service, a request for a data object;
determine that the data object is unavailable at the first data storage service, but available via another data storage service;
submit a second request to a collection of pending jobs associated with an asynchronous second interface for the other data storage service to obtain the data object from the other data storage service via an asynchronous process, wherein the response to the second request comprises instructions to obtain the data object from the other data storage service;
use the instructions to write the data object from the other data storage service to the first data storage service; and
provide the data object, from the first data storage service obtained from the other data storage service, in a synchronous response to the request.

14. The non-transitory computer-readable storage medium of claim 13, wherein the instructions further cause the computer system to store the data object obtained from the other data storage service in the first data storage service.

15. The non-transitory computer-readable storage medium of claim 14, wherein the instructions further cause the computer system to:
determine inputs associated with the requested data object; and
apply a model to the inputs to determine whether to store the data object obtained from the other data storage service in the first data storage service.

16. The non-transitory computer-readable storage medium of claim 15, wherein the model determines the length of time the data object is to be stored in the first data storage service.

17. The non-transitory computer-readable storage medium of claim 14, wherein the instructions further cause the computer system to update a location index to reflect that the data object is stored in the first data storage service.

18. The non-transitory computer-readable storage medium of claim 17, wherein the instructions further cause the computer system to:
receive, at the first data storage service, a third request for the data object; and
provide the data object from the first data storage service in a synchronous request to the third request.

19. The non-transitory computer-readable storage medium of claim 18, wherein the instructions further cause the computer system to query a location index to identify the location of the data object in the third request.

20. The non-transitory computer-readable storage medium of claim 13, wherein the first data storage service is a synchronous-access data storage service and the other data storage service is an asynchronous-access data storage service.

21. The computer-implemented method of claim 1, wherein the data storage service submits the second request, corresponding to the first request, to the other data storage service to retrieve the data object.

22. The computer-implemented method of claim 1, wherein as a result of detecting that the response to the asynchronous retrieval job has indicated that the data object is available to be retrieved, providing the requestor system with an instruction to download the data object synchronously from the local location.

\* \* \* \* \*